Figure 1:
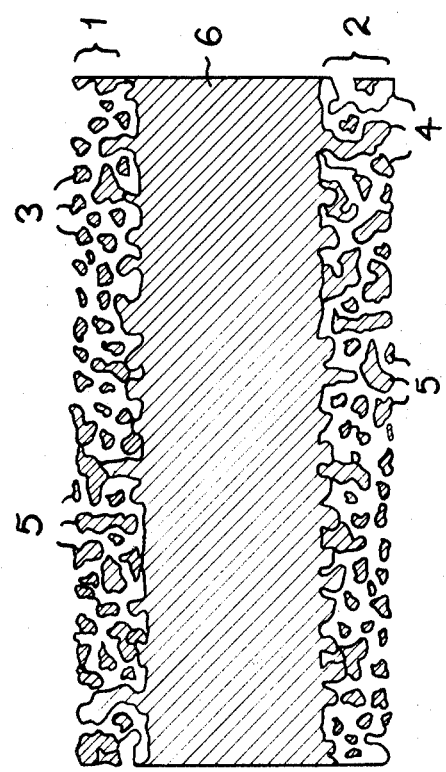

United States Patent

[11] 3,607,433

| [72] | Inventors | Arnold Isenberg<br>Neu-Isenburg II;<br>Wilfried Pabst, Frankfurt am Main; Gerd Sandstede, Frankfurt am Main, all of Germany |
|---|---|---|
| [21] | Appl. No. | 619,431 |
| [22] | Filed | Feb. 28, 1967 |
| [45] | Patented | Sept. 21, 1971 |
| [73] | Assignee | Aktiengesellschaft Brown, Boveri & Cie.<br>Baden, Switzerland |
| [32] | Priority | Mar. 11, 1966 |
| [33] | | Germany |
| [31] | | B86169 |

[54] METHOD OF PREPARATION OF ELECTRODES FOR GALVANIC HIGH-TEMPERATURE FUEL CELLS HAVING SOLID ELECTROLYTES
4 Claims, 2 Drawing Figs.

[52] U.S. Cl. .................................................. 136/120 FC
[51] Int. Cl. .................................................. H01m 13/00
[50] Field of Search.......................................... 136/120
FC, 86, 120; 117/227, 123 B; 106/57

[56] References Cited
UNITED STATES PATENTS

| 3,436,269 | 4/1969 | Mitoff............................. | 136/86 |
| 1,884,665 | 10/1932 | Greiner et al.................. | 117/123 B |
| 3,219,730 | 11/1965 | Bliton et al. ................... | 136/86 X |
| 3,300,344 | 1/1967 | Bray et al....................... | 136/86 |
| 3,383,247 | 5/1968 | Adlhart et al.................. | 136/120 |
| 3,400,019 | 9/1968 | Le Duc........................... | 136/120 |

FOREIGN PATENTS

| 626,357 | 7/1949 | Great Britain | |
| 1,369,418 | 7/1964 | France .......................... | 136/86 |
| 1,026,063 | 4/1966 | Great Britain................ | 136/86 |

*Primary Examiner*—Winston A. Douglas
*Assistant Examiner*—M. J. Andrews
*Attorney*—Pierce, Scheffler & Parker ABSTRACT: A method for the preparation of electrodes for galvanic fuel cells having solid porous surfaced electrolytes conducting ions, these cells operating at high temperatures and having electrodes made of metals and/or conductive oxides, wherein oxides are selected as starting materials and these are then connected to the porous surface of the electrolyte at high temperature either in a solid-solid or liquid-solid reaction. In one embodiment of the method, copper in powder form is applied to the porous surface of the electrolyte and heated in air to the fusion point causing infusion thereof in the form of copper oxide. The copper oxide can then be reduced immediately to form the metal or such reduction can be permitted to take place later in the cell under the influence of the hydrogen gas used in the cell. In another embodiment of the method, utilized when the oxides have a high melting point, the porous surface of the solid electrolyte is impregnated several times with a metallic salt solution such as a nickel nitrate solution and roasted after each such impregnation at a temperature of 500° C. to establish the oxide. This oxide is thereafter reacted with the solid electrolyte by further heat treatment at a temperature of 1800° C. to produce the electrode.

METHOD OF PREPARATION OF ELECTRODES FOR GALVANIC HIGH-TEMPERATURE FUEL CELLS HAVING SOLID ELECTROLYTES

The present invention relates to a method for the preparation of electrodes for galvanic fuel cells having solid electrolytes, which cells operate at high temperatures with gases as fuels or oxidizing agents.

Electrodes in such high-temperature fuel cells must adhere to the solid electrolyte. The latter consists as a rule of an oxide, for example zirconium oxide, that conducts oxygen ions at high temperatures. The electrodes are in the form of thin, usually porous layers of an electron-conducting material, to permit the diffusion of the oxygen, fuel and combustion products. Known materials for the anode include the noble metals, for example platinum (M. Binder et al., Elektrochimica Acta (London) 8, 781, 1963), and also other metals, such as nickel, chromium and cobalt, and oxides of titanium and uranium (D. T. Bray et al., Chemical Abstracts 60P, 15443c, 1964). Silver in the solid and molten states is preferred for the cathode material (U.S. Pat. No. 3,138,487; U.S. Pat. No. 3,138,488). Silver is very suitable because of its good solubility for oxygen; the oxygen can diffuse unhindered through the metal on to the electrode/solid-electrolyte phase boundary. Oxide semiconductors, e.g. oxides of nickel, copper, manganese and cobalt, may also be used as cathode material (D. T. Bray et al., Chemical Abstracts 60P, 15443c, 1964).

The electrodes are produced as follows. The solid electrolyte is coated with metal pastes or oxide pastes, which are then baked on at high temperatures, sometimes in an inert-gas atmosphere. For this purpose, fluxes are admixed with the electrode materials; these fluxes react with the solid-electrolyte substance, to effect the adhesion of the electrodes ('-'Endelmetallpreuparate fuer die Elektroindustrie", Degussa, Merkblatt No. 36, pp. 5 and 12). The fluxes often have a silicate nature, and therefore produce a considerable transition resistance from the electrode to the solid electrolyte; for they greatly reduce the oxygen-ion conductivity by reacting with the solid electrolyte.

Apart from this method, other processes, such as flame-spraying or carbonyl decomposition, are used to apply electrodes to the solid electrolyte ("Contribution a l'etude du comportement d'anodes de nickel dans les piles a combustible a electrolyte solide a base d'oxyde de zirkonium" Journees Internationales d'Etude des Piles a Combustible, Brussels, Revue Energie Primaire, 1965).

It has been found that electrodes used hitherto for operation in high-temperature fuel cells are short-lived. It is particularly difficult to obtain satisfactorily adhering anodes; for the reaction products formed evidently lift the electrode off the solid electrolyte, because they cannot diffuse through the electrode material. Electrodes have therefore been used fixed in porous coats, with which the electrolyte is coated (French patent specification No. 1,357,431). The multiple attachment of the electrode is intended to improve the adhesion.

The electrodes prepared according to the invention do not have the above mentioned disadvantages. The method for their preparation is characterized in that starting material (oxides) for electrodes are selected that are connected to the solid electrolyte at high temperatures in a solid-solid or liquid-solid reaction.

If the oxides are used as electrodes, it is a surprising fact that, although the expansion coefficients of the oxide and the solid electrolyte are different, a very durable connection to the solid electrolyte is obtained, even with varying heat stress. This is also the case when metallic electrodes are produced by the reduction of the oxides.

A porous electrode results from the reduction and the accompanying volume shrinkage. This facilitates diffusion by the gases.

Figure 2:
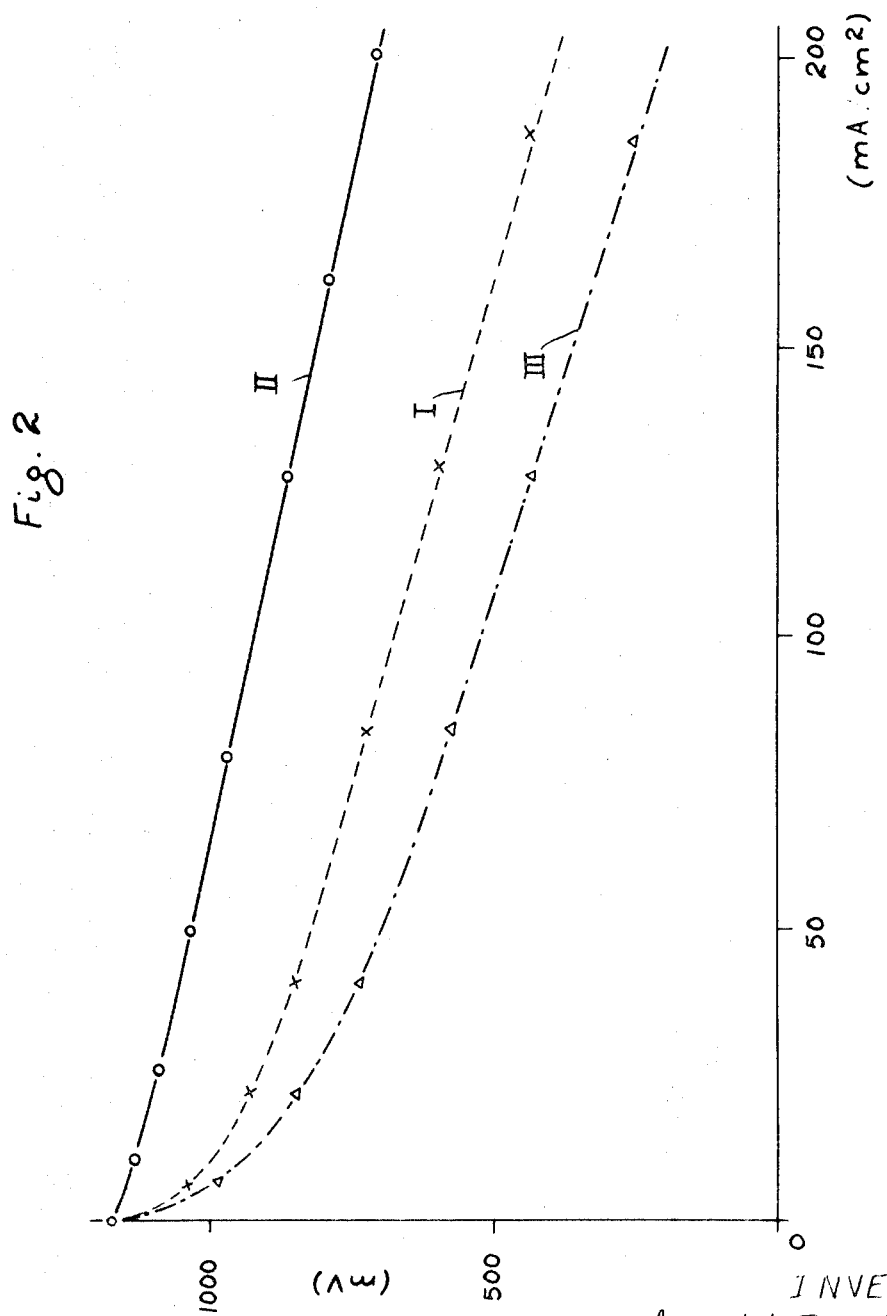

Other details, features and advantages of the invention will become apparent from the following description of some preferred exemplifying embodiments, and by means of the accompanying diagrammatic drawings, in which:

FIG. 1 is a cross section through a solid electrolyte having electrodes on both sides, and FIG. 2 is a current-voltage diagram.

In FIG. 1, a solid electrolyte 6 with electrodes 1 and 2 on both sides is shown. The electrode material 3 and 4 forming the electrodes 1 and 2 is in the form of a film on an electrode carrier 5, which is connected to the solid electrolyte 6 by sintering.

FIG. 2 reproduces current-voltage curves of cells. The current density is indicated in ma./cm.$^2$ on the abscissa, and the cell voltage is indicated in mv. on the ordinate. Curve I was obtained with a solid-electrolyte fuel cell, whose solid electrolyte consisted of a mixed oxide of zirconium and yttrium. Both the cathode and the anode were made of platinum. The working temperature of the cell was 900° C.; the fuel used was hydrogen; oxygen was used as an oxidizing agent. The electrodes have been obtained by baking a metallizing paste on to the polished solid electrolyte. Curve II was recorded under the same conditions of temperature, fuel gas and oxidizing agent. But a copper electrode according to the invention was used as an anode. The electrode was produced by fusing copper oxide at 1180 to 1190° C. on to a porous layer of solid electrolyte, and then reducing the oxide with hydrogen at 900° C. The cell-characteristic slope of the copper electrode, with silver as a cathode, changed only insignificantly after loading for 400 hours with a current density of 450 ma./cm.$^2$. The cell with platinum electrodes, on the other hand, had a reduced electrode performance after only 50 hours (curve III).

The method according to the invention for producing electrodes will now be described.

Example 1

To prepare the solid electrolyte, 2 grams of a finely powdered mixed oxide, consisting of 92 mols percent of zirconium oxide and 8 mols percent of yttrium oxide, were poured into a mould having a diameter of 24 mm. and pressed smooth by very slight pressure of about 1 kp/cm$^2$. This layer was coated with 200 mg. of an intimate mixture of 40 percent by volume of the same oxide powder and 60 percent by volume of ammonium carbonate, and the tablet was moulded at a high pressure of about 5 Mp/cm$^2$. The same procedure would be followed if both sides of the solid electrolyte were to be given a porous coat. The porous coat measured about 0.2 mm. after moulding. The mixture of oxide powder and ammonium carbonate could contain up to 80 percent by volume of this salt. Up to 80 percent by volume of carbon and other fugitive material which are combustible or sublimable could be used instead of ammonium carbonate. When the moulded tablets were heated, the ammonium salt vaporized, or the carbon was burned away. After sintering at 1800° C., the porous skeleton for the electrodes was firmly attached to the compact solid electrolyte. 200 mg. of very fine copper powder, which oxidized when heated in air, were scattered on the porous coat. The melting point of this oxide in air was between 1170° and 1190° C. The fused oxide was sucked into the porous coat, and reacted with the zirconium oxide. After a short reaction time of 1 to 5 minutes, calculated from the beginning of fusion, the material was cooled to below 1000° C. The oxide could be reduced immediately at 900° C. to form the metal, or it could be reduced in the cell under the influence of hydrogen.

Example 2

According to a variant of the method according to the invention, the porous coat of solid electrolyte, the preparation of which has already been described under Example 1, was impregnated several times, namely four times, with a salt solution, for example a saturated nickel nitrate solution. The salt was roasted after each impregnation in the porous coat at 500° C. to form an oxide. The resulting oxide in the porous matrix was then reacted with the solid electrolyte by temperature treatment at 1800° C. It is preferable to use this method when the oxides have a high melting point, and therefore cannot easily be incorporated in the porous carrier coat by fusion; this applies to oxides of the metals iron, cobalt, nickel, chromium and manganese. The reaction between the electrolyte and the oxide must then be a solid-state reaction. When doped zirconium oxide was used as an electrolyte, the reaction temperature of the above mentioned oxides was below the sintering temperature of the electrolyte (1800° C.), namely about 1300° C. for iron oxide, about 1600° C. for cobalt oxide, about 1700° C. for nickel oxide, 1600° C. for manganese oxide, about 1800° C. for chromium oxide and about 1600° C. for titanium oxide.

We claim:

1. A method for the preparation of electrodes for high temperature galvanic fuel cells from a solid electrolyte having at least one smooth surface comprising the steps of applying to at least one smooth surface of the solid electrolyte a coating composition including the same material as the solid electrolyte and a fugitive material, heating the coating to remove the fugitive material to provide a porous coating said porous coating capable of conducting oxygen ions, then impregnating the porous electrolyte coating with an electrode material selected from the group consisting of electrode metals, electrode metal oxides and electrode metallic salt solutions, and heating the electrode material disposed in and on the porous electrode coating to a temperature to react the electrode material with the porous electrolyte coating and the solid electrolyte.

2. A method as claimed in claim 1 wherein the electrode material is a metal oxide selected from the group consisting of the oxides of iron, cobalt, nickel, chromium manganese, titantium and mixtures thereof and wherein the heating step is carried out at at least 1300° C.

3. A method as claimed in claim 1 wherein the electrode material is a metallic salt solution of a metal selected from the group consisting of iron, cobalt, nickel, chromium and manganese, and wherein the solution is repeatedly impregnated in the porous coating and wherein the heating step comprises roasting the impregnated solution to at least 500° C. to produce the metal oxide thereof after each of the impregnations and further heating the metal oxides so formed to react with the porous electrolyte coating and the solid electrolyte.

4. A method as claimed in claim 1 wherein the electrode material is copper oxide and wherein the heating step is carried out at at least 1190° C.